United States Patent
Zhang et al.

(10) Patent No.: US 11,531,241 B2
(45) Date of Patent: Dec. 20, 2022

(54) ARRAY SUBSTRATE AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Yongqiang Zhang, Beijing (CN); Jingyi Xu, Beijing (CN); Hong Liu, Beijing (CN); Peng Liu, Beijing (CN); Peirong Huo, Beijing (CN); Aiyu Ding, Beijing (CN); Zhenhong Xiao, Beijing (CN); Bo Li, Beijing (CN); Bo Huang, Beijing (CN)

(73) Assignees: ORDOS YUANSHENG OPTOELECTRONICS CO., LTD., Ordos (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/342,604

(22) Filed: Jun. 9, 2021

(65) Prior Publication Data
US 2022/0137471 A1     May 5, 2022

(30) Foreign Application Priority Data
Oct. 30, 2020   (CN) .......................... 202011193425.0

(51) Int. Cl.
*G02F 1/1362* (2006.01)

(52) U.S. Cl.
CPC .............................. *G02F 1/136286* (2013.01)

(58) Field of Classification Search
CPC ................................................. G02F 1/136286
See application file for complete search history.

(56) References Cited

U.S. PATENT DOCUMENTS

| | | | |
|---|---|---|---|
| 2016/0171940 A1* | 6/2016 | Kim | G09G 3/3614 345/88 |
| 2019/0072826 A1* | 3/2019 | Jiang | G02F 1/133707 |
| 2020/0234622 A1* | 7/2020 | Xiong | G09G 3/20 |

FOREIGN PATENT DOCUMENTS

CN          113745274      * 12/2021      ............. H01L 27/32

* cited by examiner

*Primary Examiner* — Sang V Nguyen
(74) *Attorney, Agent, or Firm* — Fay Sharpe LLP

(57) ABSTRACT

A substrate in an array substrate includes a light aperture region and a winding region arranged around the light aperture region. On the substrate, an orthographic projection of a first winding in each first signal line is overlapped with an orthographic projection of a second winding in a corresponding second signal line. In this way, the distance between two adjacent signal lines in the winding region is larger, and the parasitic capacitance generated between them is smaller.

20 Claims, 7 Drawing Sheets

ARRAY SUBSTRATE AND DISPLAY DEVICE

This application claims priority to Chinese Patent Application No. 202011193425.0, filed on Oct. 30, 2020 and entitled "ARRAY SUBSTRATE AND MANUFACTURING METHOD THEREOF, AND DISPLAY DEVICE," the disclosure of which is incorporated herein by reference in its entirety.

TECHNICAL FIELD

The present disclosure relates to the field of display technologies, and in particular, relates to an array substrate and a display device.

BACKGROUND

With respect to a full-screen display device, the size of a display screen can be increased without increasing the overall size of the display device due to higher screen-to-body ratio (generally up to 80% or even more than 90%). Generally, the front side of the full-screen display device (i.e., the side that is coplanar with the display surface) needs to be equipped with various photosensitive sensors such as cameras or light sensors. In order not to affect the screen-to-body ratio of the full-screen display device, a light aperture may be provided in the display screen of the full-screen display device, and it is necessary to ensure that the area where the light aperture is disposed is within the display region of the display screen. A photosensitive surface of the photosensitive sensor faces the light aperture, such that ambient light can pass through the light aperture and then enter the photosensitive surface of the photosensitive sensor, thereby allowing the photosensitive sensor to function properly.

SUMMARY

Embodiments of the present disclosure provide an array substrate and a display device.

In one aspect, an array substrate is provided.

The array substrate includes: a substrate including a light aperture region and a winding region, wherein the winding region is arranged around the light aperture region; a plurality of sub-pixels disposed on the substrate and arranged in a plurality of columns; and a plurality of first signal lines disposed on the substrate, and a plurality of second signal lines corresponding to the plurality of first signal lines; wherein the first signal line including a first pixel connection wiring and a first winding connected to each other, wherein the first pixel connection wiring is connected to a column of sub-pixels, and the first winding is disposed in the winding region; the second signal line includes a second pixel connection wiring and a second winding connected to each other, wherein the second pixel connection wiring is connected to a column of sub-pixels, the second winding is disposed in the winding region, and the first winding and the second winding being arranged in different layers; wherein an orthographic projection of the first winding in the first signal line is at least partially overlapped with an orthographic projection of the second winding in the corresponding second signal line on the substrate, and voltages of the same polarity are applied to the first signal line and the corresponding second signal line.

In some embodiments, the first winding includes a first jumper wiring arranged around the light aperture region, and the second winding includes a second jumper wiring arranged around the light aperture region, wherein a first orthographic projection of the first jumper wiring is at least partially overlapped with a second orthographic projection of the second jumper wiring on the substrate.

In some embodiments, one of the first orthographic projection and the second orthographic projection is within the other.

In some embodiments, in the plurality of first signal lines and the plurality of second signal lines, an overlapping region of the orthographic projections of one first jumper wiring and one second jumper wiring on the substrate is increased gradually in a direction away from the light aperture region.

In some embodiments, the first winding further includes a first lead for connecting the first jumper wiring and the first pixel connection wiring, wherein the first lead is extended in the same direction as the first pixel connection wiring; and the second winding further includes a second lead for connecting the second jumper wiring and the second pixel connection wiring, wherein the second lead is extended in the same direction as the second pixel connection wiring.

In some embodiments, charging periods of the sub-pixels connected to the first signal line and the sub-pixels connected to the corresponding second signal line are the same.

In some embodiments, the plurality of sub-pixels include sub-pixels of at least two colors, wherein the color of the sub-pixels connected to the first signal line is the same as that of the sub-pixels connected to the corresponding second signal line.

In some embodiments, the plurality of first signal lines include a plurality of first signal line groups, wherein each of the first signal line groups includes at least two consecutively arranged first signal lines, and the first pixel connection wirings in the at least two consecutive first signal lines constitute a first pixel connection wiring group; the plurality of second signal lines includes a plurality of second signal line groups, wherein each of the second signal line groups includes at least two consecutive second signal lines, and the second pixel connection wirings in the at least two consecutive second signal lines constitute a second pixel connection wiring group; and a plurality of first pixel connection wiring groups and a plurality of second pixel connection wiring groups are alternately distributed.

In some embodiments, voltages of opposite polarities are applied to any two adjacent first signal lines in the first signal line group; and voltages of opposite polarities are applied to any two adjacent second signal lines in the second signal line group.

In some embodiments, the first signal line and the corresponding second signal line are respectively disposed in the adjacent first signal line group and second signal line group.

In some embodiments, a signal line is arranged between each of the first signal lines and the corresponding second signal line, and an identical number of signal lines are arranged between each of the first signal lines and the corresponding second signal line.

In some embodiments, the first pixel connection wiring and the first winding are arranged in the same layer in the first signal line; and the second pixel connection wiring and the second winding are arranged in different layers in the second signal line.

In some embodiments, the first signal line and the second pixel connection wiring are arranged in the same layer.

In some embodiments, the array substrate further includes a plurality of gate lines disposed on the substrate, wherein the second winding are arranged in the same layer as the gate lines.

In some embodiments, the array substrate includes a display region, wherein the plurality of sub-pixels are disposed in the display region; and the array substrate further includes a plurality of touch electrode lines disposed on the substrate, wherein the touch electrode lines include a first touch line disposed in the display region, and a second touch line disposed in the winding region and connected to the first touch line, wherein the first touch line and the second touch line are arranged in different layers.

In some embodiments, the first touch line and the second pixel connection wiring are arranged in the same layer, and the second touch line and the second winding are arranged in the same layer.

In some embodiments, the array substrate further includes a plurality of third signal lines disposed on the substrate, wherein the third signal lines is disposed in the display region and outside the winding region and the third signal lines are connected to a column of sub-pixels.

In another aspect, a display device is provided. The display device includes: an array substrate and a color filter substrate arranged oppositely, and a liquid crystal layer disposed between the array substrate and the color filter substrate.

The array substrate includes: a substrate including a light aperture region and a winding region, wherein the winding region is arranged around the light aperture region; a plurality of sub-pixels disposed on the substrate and arranged in a plurality of columns; and a plurality of first signal lines disposed on the substrate, and a plurality of second signal lines corresponding to the plurality of first signal lines; wherein the first signal line include a first pixel connection wiring and a first winding connected to each other, wherein the first pixel connection wiring is connected to a column of sub-pixels, and the first winding is disposed in the winding region; the second signal line include a second pixel connection wiring and a second winding connected to each other, wherein the second pixel connection wiring is connected to a column of sub-pixels, the second winding is disposed in the winding region, and the first winding and the second winding are arranged in different layers; wherein an orthographic projection of the first winding in the first signal line is at least partially overlapped with an orthographic projection of the second winding in the corresponding second signal line on the substrate, and voltages of the same polarity are applied to the first signal line and the corresponding second signal line.

In some embodiments, the display device further includes a driver connected to the first signal line and the second signal line in the array substrate, wherein the driver is configured to apply voltages of the same polarity to the first signal line and the corresponding second signal line simultaneously, such that the sub-pixels connected to the first signal line and the sub-pixels connected to the second signal line are charged simultaneously.

In some embodiments, the display device further includes a photosensitive sensor, wherein the photosensitive sensor is disposed on a side of the array substrate away from the color filter substrate, and an orthographic projection of a photosensitive surface of the photosensitive sensor on the substrate in the array substrate is within the light aperture region.

DETAILED DESCRIPTION

For clearer descriptions of the objectives, technical solutions, and advantages of the present disclosure, embodiments of the present disclosure are described in detail hereinafter referring to the accompanying drawings.

A display screen of a full-screen display device usually has a light aperture region and a display region disposed outside the light aperture region. The display screen may include a liquid crystal display panel and a backlight module.

The backlight module has a light aperture disposed in the light aperture region. An array substrate in the liquid crystal display panel may include a plurality of sub-pixels arranged in an array and disposed in the display region, and no sub-pixels are arranged in the light aperture region.

In the array substrate, each column of sub-pixels needs to be connected to a signal line (the signal line is also referred to as a data line). The sub-pixels connected to each signal line are of the same type. For example, the sub-pixels connected to one signal line are all red sub-pixels, green sub-pixels or blue sub-pixels.

Since the light aperture region is distributed in the display region, and no sub-pixels are arranged in the light aperture region, when a signal line needs to pass through the light aperture region to connect sub-pixels disposed on both sides of the light aperture region, in order to ensure a high light transmittance of the light aperture region, it is necessary to provide a winding region between the light aperture region and the display region and dispose a part of the signal line that needs to pass through the light aperture region in the winding region. As the area of the winding region is usually small, the signal lines arranged in the winding region are usually arranged in a double-layer wiring fashion.

Figure 1:
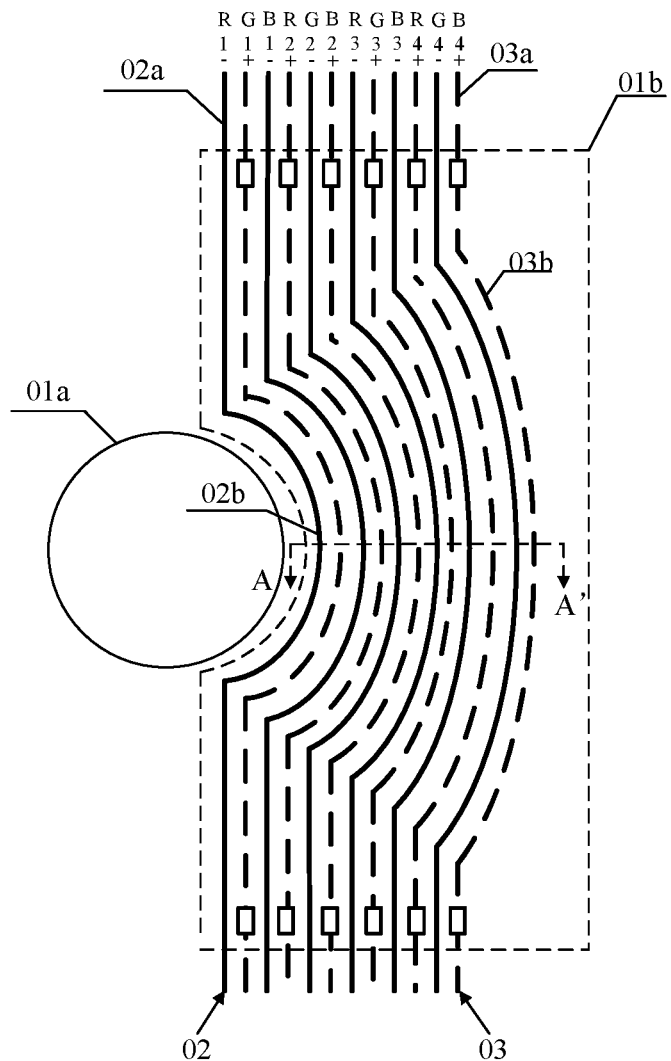
FIG. 1 is a top view of a light aperture region and a winding region in an array substrate in the related art.
Figure 2:
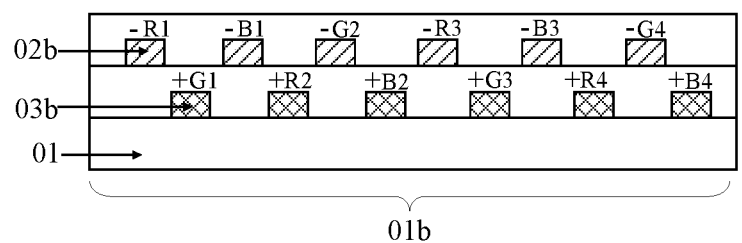
FIG. 2 is a cross-sectional view of the array substrate shown in FIG. 1 at A-A'.

In an exemplary embodiment, referring to FIGS. 1 and 2, FIG. 1 is a top view of a light aperture region and a winding region in an array substrate in the related art, and FIG. 2 is a cross-sectional view of the array substrate shown in FIG. 1 at A-A. The array substrate may include: a substrate 01 including a light aperture region 01a and a winding region 01b. The winding region 01b is arranged around the light aperture region 01a.

The array substrate further includes a plurality of sub-pixels (not shown in the figure) disposed on the substrate 01, and a plurality of first signal lines 02 (the thick solid line part in the figure) and a plurality of second signal lines 03 (the thick dashed part in the figure) disposed on the substrate 01. The plurality of sub-pixels may be arranged in a plurality of rows and a plurality of columns, i.e., arranged in a matrix. The plurality of first signal lines 02 and the plurality of second signal lines 03 are alternately distributed.

The first signal line 02 includes a first pixel connection wiring 02a connected to a column of sub-pixels, and a first jumper wiring 02b disposed in the winding region 01b and connected to the first pixel connection wiring 02a. The first jumper wiring 02b is arranged around the light aperture region 01a. The first pixel connection wiring 02a and the first jumper wiring 02b are arranged in the same layer.

The second signal line 03 includes a second pixel connection wiring 03a connected to a column of sub-pixels, and a second jumper wiring 03b disposed in the winding region 01b and connected to the second pixel connection wiring 03a. The second jumper wiring 03b is arranged around the light aperture region 01a. The second pixel connection wiring 03a and the second jumper wiring 03b are arranged in different layers. Moreover, an orthographic projection of the second jumper wiring is not overlapped with an orthographic projection of the first jumper wiring on the substrate 01.

Each sub-pixel in the array substrate may include a thin-film transistor (TFT) and a pixel electrode connected to a first electrode of the TFT. For any row of sub-pixels, a gate of the TFT in each sub-pixel is connected to a gate line, through which the TFTs in a row of sub-pixels may be controlled to be turned on or off simultaneously. For any column of sub-pixels, a second electrode of the TFT in each sub-pixel is connected to a signal line, through which a voltage may be applied to the pixel electrode. One of the first electrode and the second electrode may be a source electrode, and the other may be a drain electrode.

When the array substrate is used to manufacture a display device, the signal lines (i.e., the first signal line and the second signal line) in the array substrate need to be electrically connected to a drive controller in the display device, through which a drive voltage may be applied to the signal line.

The drive controller may be connected to the signal lines in the array substrate through a multiplexer (MUX). The number of signal output ports in the drive controller for outputting the drive voltage can be reduced by the MUX. For example, two signal output ports may be connected to six signal lines through the MUX in the drive controller. In this case, the drive controller may also be called a 2:6 MUX drive controller.

Figure 3:
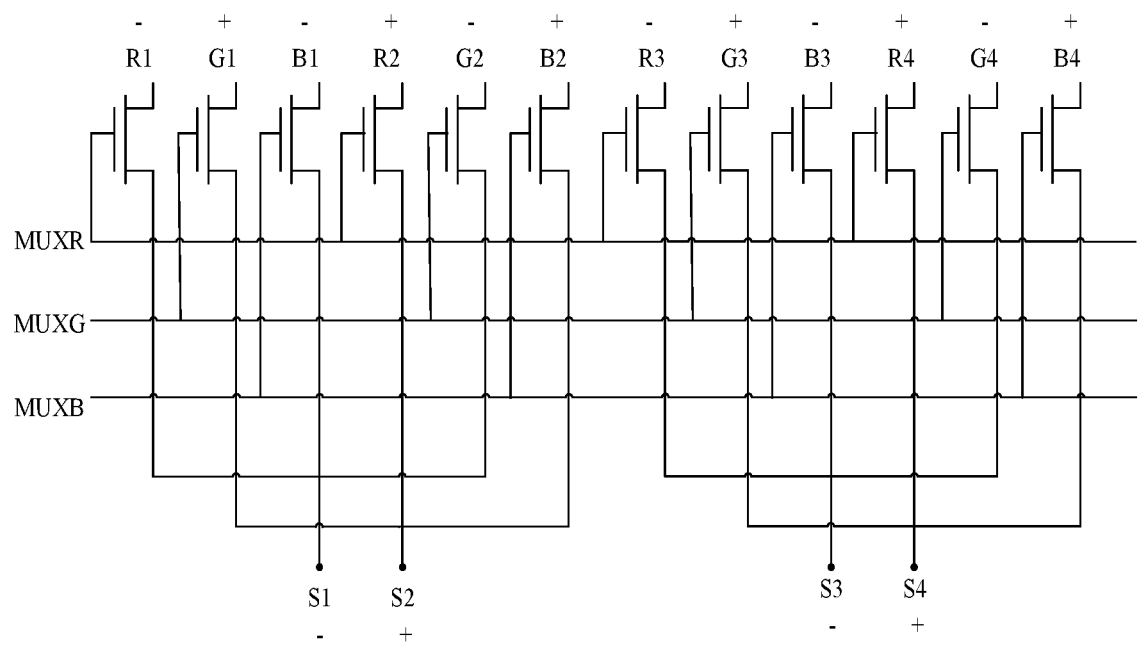
FIG. 3 is a circuit schematic diagram of a 2:6 MUX drive controller.
Figure 4:
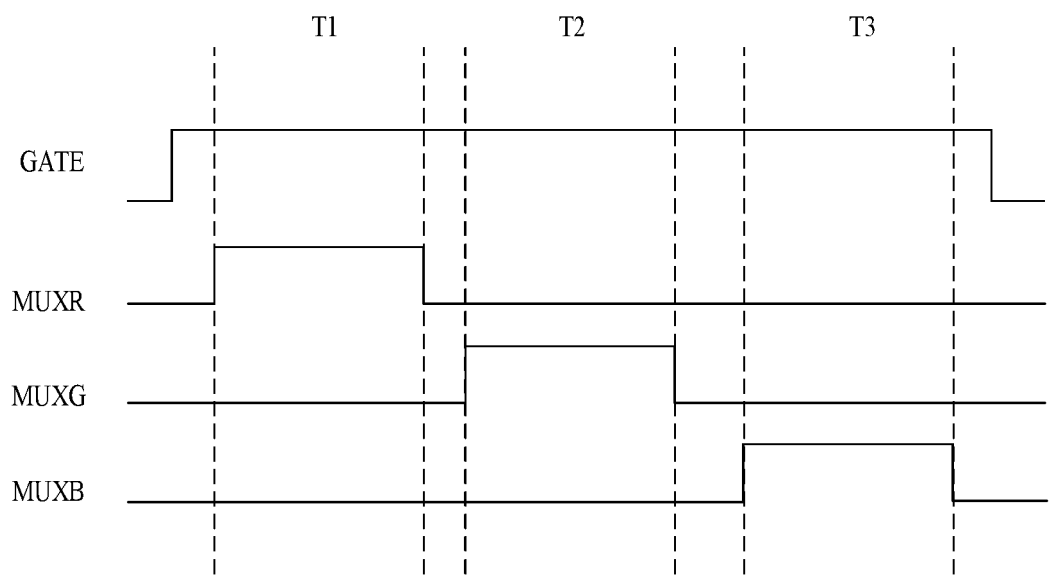
FIG. 4 is a timing diagram of the 2:6 MUX drive controller.

Referring to FIGS. 3 and 4, FIG. 3 is a circuit schematic diagram of a 2:6 MUX drive controller, and FIG. 4 is a timing diagram of the 2:6 MUX drive controller. In FIG. 3, R1-R4 represent four signal lines, and sub-pixels connected to each signal line are all red sub-pixels. G1-G4 represent four signal lines, and sub-pixels connected to each signal line are all green sub-pixels. B1-B4 represent four signal lines, and sub-pixels connected to each signal line are all blue sub-pixels. S1-S4 are four signal output ports in the MUX, in which the polarities of the voltages output by S1 and S2 are opposite, and the polarities of the voltages output by S3 and S4 are opposite. MUXR, MUXG, and MUXB are three selection terminals in the MUX, which are configured to allow 12 signal lines connected to the MUX to be selectively connected to S1-S4.

In an exemplary embodiment, the operating process of the MUX drive controller is as follows.

First, assuming that a target pixel row is any row of sub-pixels among a plurality of sub-pixels, when a gate port GATE connected to a gate line of the target pixel row is connected to a high level, the TFT of each sub-pixel in the target pixel row is turned on.

After that, at time T1, the MUXR is connected to a high-level signal, and the signal lines R1-R4 are connected to the signal output ports S1-S4 and voltages are applied to the signal lines R1-R4 such that the four red sub-pixels in the target pixel row connected to the signal lines R1-R4 are charged. The signal line R1 is connected to the signal output port S1 and a negative voltage is applied to the signal line R1. The signal line R2 is connected to the signal output port S2 and a positive voltage is applied to the signal line R2. The signal line R3 is electrically connected to the signal output port S3 and a negative voltage is applied to the signal line R3. The signal line R4 is electrically connected to the signal output port S4 and a positive voltage is applied to the signal line R4.

At time T2, MUXR is connected to a low-level signal, and MUXG is connected to a high-level signal. In this case, the signal lines R1-R4 are in an idle state (i.e., no voltage is applied to the signal lines R1-R4), and the signal lines G1-G4 are connected to the signal output ports S1-S4 and voltages are applied to the signal lines G1-G4 such that the four green sub-pixels in the target pixel row connected to the signal lines G1-G4 are charged. The signal line G1 is connected to the signal output port S2 and a positive voltage is applied to the signal line G1. The signal line G2 is connected to the signal output port S1 and a negative voltage is applied to the signal line G2. The signal line G3 is connected to the signal output port S4 and a positive voltage is applied to the signal line G3. The signal line G4 is connected to the signal output port S3 and a negative voltage is applied to the signal line G4.

After that, at time T3, both MUXR and MUXG are connected to a low-level signal, and MUXB is connected to a high-level signal. In this case, the signal lines R1-R4 and the signal lines G1-G4 are all in an idle state, and the signal lines B1-B4 are connected to the signal output ports S1-S4 and voltages are applied to the signal lines B1-B4 such that the four blue sub-pixels in the target pixel row connected to the signal lines B1-B4 are charged. The signal line B1 is connected to the signal output port S1 and a negative voltage is applied to the signal line B1. The signal line B2 is connected to the signal output port S2 and a positive voltage is applied to the signal line B2. The signal line B3 is connected to the signal output port S3 and a negative voltage is applied to the signal line B3. The signal line B4 is connected to the signal output port S4 and a positive voltage is applied to the signal line B4.

Finally, the gate port GATE connected to the gate line of the target pixel row is connected to a low level, and the TFT of each sub-pixel in the target pixel row is turned off.

In a column-inverted liquid crystal display panel, voltages stored in the same column of sub-pixels have the same polarity, and voltages stored in any two adjacent columns of sub-pixels have opposite polarities. As shown in FIGS. 1 and 2, in the winding region, voltages of opposite polarities are applied to any two adjacent first signal line 02 and second signal line 03. Due to the small area of the winding region, the distance between any two adjacent first signal line 02 and second signal line 03 is small, which in turn leads to a large parasitic capacitance between any two adjacent first signal line 02 and second signal line 03.

When the MUX drive controller is adopted, the sub-pixels in the target pixel row connected to the MUX are charged in a time-sharing fashion. At time T1, MUXR is connected to a high-level signal, and the four red sub-pixels in the target pixel row connected to the signal lines R1-R4 are charged. At time T2, MUXR is connected to a low-level signal, the signal lines R1-R4 are in an idle state, MUXG is connected to a high-level signal, and the four green sub-pixels in the target pixel row connected to the signal lines G1-G4 are charged. In this case, the polarities of the voltages applied to the signal lines G1-G4 are opposite to the polarities of the voltages applied to the adjacent signal lines R1-R4, and the signal lines R1-R4 are in an idle state. As a result, the voltages applied to the signal lines R1-R4 are reduced by the voltages applied to the adjacent signal lines G1-G4 under the influence of the parasitic capacitance. This leads to a reduction in the voltages applied to the pixel electrodes in the four red sub-pixels connected to the signal lines R1-R4 in the target pixel row, which in turn causes a reduction in the charging rate of the four red sub-pixels.

Similarly, at time T3, MUXR and MUXG are both connected to a low-level signal, the signal lines R1-R4 and the signal lines G1-G4 are all in an idle state, MUXB is connected to a high-level signal, and the four blue sub-pixels in the target pixel row connected to the signal lines B1-B4 are charged. In this case, since the polarities of the voltages applied to the signal lines B1-B4 are opposite to the polarities of the voltages applied to the adjacent signal lines R1-R4 and the voltages applied to the adjacent signal lines G1-G4, and the signal lines R1-R4 and the signal lines G1-G4 are all in an idle state. As a result, the voltages applied to the signal lines R1-R4 and the voltages applied to the signal lines G1-G4 will both be reduced by the voltages applied to the adjacent signal lines B1-B4 under the influence of the parasitic capacitance. This leads to a reduction in the voltages applied to the pixel electrodes in the four red sub-pixels connected to the signal lines R1-R4 in the target pixel row, and this also leads to a reduction in the voltages applied to the pixel electrodes in the four green sub-pixels connected to the signal lines G1-G4 in the target pixel row, which in turn causes the charging rate of the four red sub-pixels and the four green sub-pixels to decrease.

In the array substrate, the luminance of sub-pixels is also lower for the sub-pixels with lower charging efficiency. Therefore, dark vertical stripes may appear on a display screen of a display device where the array substrate is disposed, affecting the display effect of the display device.

Figure 5:
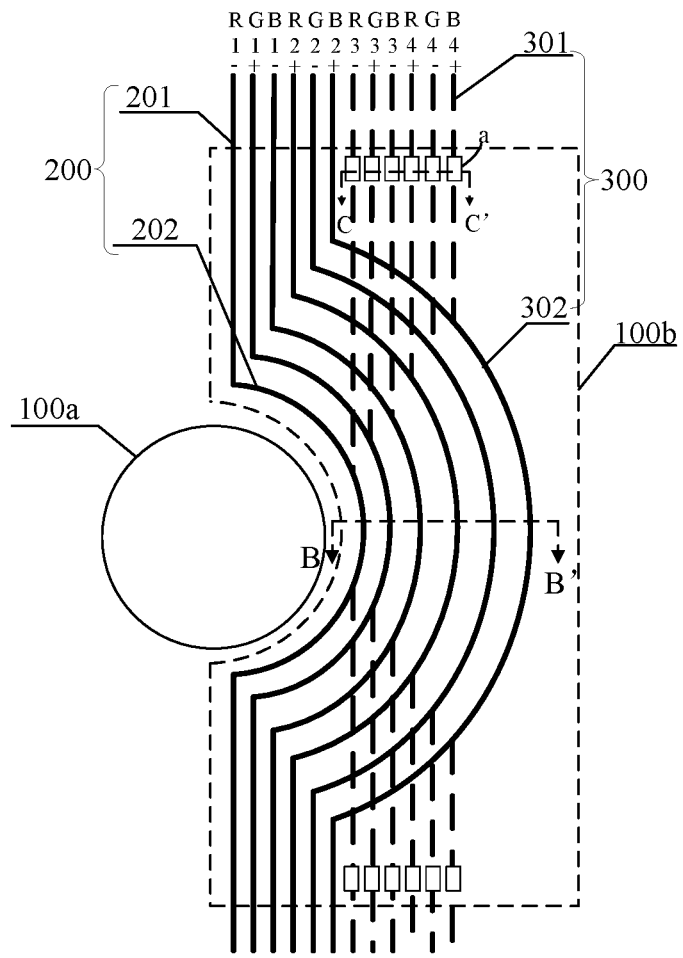
FIG. 5 is a top view of a light aperture region and a winding region in an array substrate according to an embodiment of the present disclosure.
Figure 6:
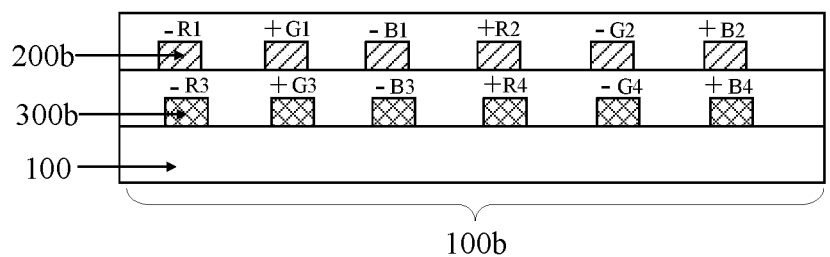
FIG. 6 is a cross-sectional view of the array substrate shown in FIG. 5 at B-B'.

Referring to FIG. 5 and FIG. 6, FIG. 5 is a top view of a light aperture region and a winding region in an array substrate according to an embodiment of the present disclosure, and FIG. 6 is a cross-sectional view of the array substrate shown in FIG. 5 at B-B'. The array substrate may include a substrate 100 including a light aperture region 100a and a winding region 100b. The winding region 100b is arranged around the light aperture region 100a.

The array substrate may further include a plurality of sub-pixels (not shown in the figure) disposed on the substrate 100, a plurality of first signal lines 200 (the thick solid line part in the figure) disposed on the substrate 100, and a plurality of second signal lines 300 (the thick dashed line part in the figure) corresponding to the plurality of first signal lines 200. The plurality of sub-pixel arrays are arranged in a plurality of columns. In the present disclosure, the plurality of first signal lines 200 one-to-one correspond to the plurality of second signal lines 300.

The first signal line 200 may include a first pixel connection wiring 201 and a first winding 202 connected to each other. The first pixel connection wiring 201 is connected to a column of sub-pixels in the array substrate. The first winding 202 is disposed in the winding region 100b.

The second signal line 300 may include a second pixel connection wiring 301 and a second winding 302 connected to each other. The second pixel connection wiring 301 is connected to a column of sub-pixels in the array substrate. The second winding 302 is disposed in the winding region 100b. It should be noted that the column of sub-pixels connected to the first pixel connection wiring 201 in the array substrate is different from the column of sub-pixels connected to the second pixel connection wiring 301 in the array substrate.

The first winding 202 in the first signal line 200 and the second winding 302 in the second signal line 300 are arranged in different layers. In an exemplary embodiment, the first pixel connection wiring 201 and the first winding 202 in the first signal line 200 are arranged in the same layer, while the second pixel connection wiring 301 and the second winding 302 in the second signal line 300 are arranged in different layers. In this case, the plurality of first signal lines 200 are formed through a one patterning process, and the plurality of second signal lines 300 are formed through a two patterning process. It should be noted that one patterning process may include photoresist coating, exposure, development, etching, and photoresist stripping.

Figure 7:
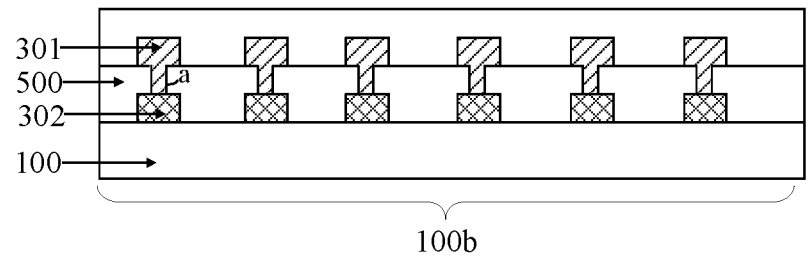
FIG. 7 is a cross-sectional view of the array substrate shown in FIG. 5 at C-C'.

In some embodiments, referring to FIG. 7, FIG. 7 is a cross-sectional view of the array substrate shown in FIG. 5 at C-C'. In the second signal line 300, the second pixel connection wiring 301 and the second winding 302 are respectively disposed on both sides of an insulating layer 500 where a via hole a is provided. In this way, the second pixel connection wiring 301 is electrically connected to the second winding 302 through the via hole a.

In the present disclosure, on the substrate 100, an orthographic projection of the first winding 202 in each of the first signal lines 200 is at least partially overlapped with an orthographic projection of the second winding 302 in the corresponding second signal line 300. When the array substrate shown in the embodiment of the present disclosure is applied to a column-inverted liquid crystal display panel, any two adjacent signal lines in the array substrate are configured to apply voltages of opposite polarities, while each of the first signal lines 200 and the corresponding second signal line 300 in the array substrate are configured to apply voltages of the same polarity. It should be noted that the two adjacent signal lines may be two adjacent first signal lines 200, or two adjacent second signal lines 300, or, one first signal line 200 and one second signal line 300.

In this case, when on the substrate 100, an orthographic projection of the first signal line 200 and an orthographic projection of the corresponding second signal line 300 are at least partially overlapped in the winding region 100b, even in the winding region 100b, a parasitic capacitance between them is larger. However, since the voltages applied to the first signal line 200 and the corresponding second signal line 300 have the same polarity, the voltage applied to one of them has less influence on the voltage applied to the other.

Moreover, with respect to the wiring scheme in which the signal lines have no overlap on the substrate, when the orthographic projection of the first signal line 200 and the orthographic projection of the corresponding second signal line 300 are at least partially overlapped in the winding region 100b on the substrate 100, the distance between the two adjacent signal lines in the winding region 100b is larger, resulting in a smaller parasitic capacitance between them. In this way, even if the voltages applied to the two adjacent signal lines have opposite polarities, one signal line is less affected by the other signal line.

In an exemplary embodiment, for signal lines arranged according to a wiring array cycle width of 5.6 µm, the distance between two adjacent signal lines can be increased from 0.8 µm to 3.6 µm in the winding region 100b. In this way, if the parasitic capacitance is extracted with a length of 100 µm as a unit, the parasitic capacitance between two adjacent signal lines in the winding region 100b can be reduced from 6.43 fF to 0.69 fF in the winding region 100b.

As shown in FIGS. 3 and 4, when the MUX drive controller is used, the sub-pixels in the target pixel row connected to the MUX are charged in a time-sharing fashion. In conjunction with FIG. 5 and FIG. 6, at time T1, MUXR is connected to a high-level signal, and the four red sub-pixels in the target pixel row connected to the signal lines R1-R4 are charged. At time T2, since MUXR is connected to a low-level signal, the signal lines R1-R4 are idling, and MUXG is connected to a high-level signal, and the four green sub-pixels in the target pixel row connected to the signal lines G1-G4 are charged. In this case, the polarities of the voltages applied to the signal lines G1-G4 are opposite to the polarities of the voltages applied to the adjacent signal lines R1-R4. In the embodiment of the present disclosure, the parasitic capacitance generated between the two adjacent signal lines is greatly reduced due to the large distance between the two adjacent signal lines in the winding region 100b. Therefore, the voltages applied to the signal lines R1-R4 are less affected by the voltages applied to the adjacent signal lines G1-G4. The voltages applied to the pixel electrodes in the four red sub-pixels connected to the signal lines R1-R4 in the target pixel row will not be greatly reduced, and the charging rate of the four red sub-pixels will only be reduced slightly.

Similarly, at time T3, MUXR and MUXG are both connected to a low-level signal, the signal lines R1-R4 and the signal lines G1-G4 are all in an idle state, MUXB is connected to a high-level signal, and the four blue sub-pixels in the target pixel row connected to the signal lines B1-B4 are charged. In this case, the polarities of the voltages applied to the signal lines B1-B4 are opposite to the polarities of the voltages applied to the adjacent signal lines R1-R4; the polarities of the voltages applied to the signal lines B1-B4 are also opposite to the polarities of the voltages applied to the adjacent signal lines G1-G4. In the embodiment of the present disclosure, the parasitic capacitance generated between the two adjacent signal lines is greatly reduced due to the large distance between two adjacent signal lines in the winding region 100b. Therefore, the voltages applied to the signal lines R1-R4 and the voltages applied to the signal lines G1-G4 are less affected by the voltages applied to the adjacent signal lines B1-B4. The voltages applied to the pixel electrodes in the four red sub-pixels in the target pixel row connected to the signal lines R1-R4 will not be greatly reduced, and the voltages applied to the pixel electrodes of the four green sub-pixels connected to the signal lines G1-G4 in the target pixel row will not be greatly reduced, and the charging rates of the four red sub-pixels and the four green sub-pixels will only be slightly reduced.

In this way, the phenomenon of dark vertical stripes on a display screen of a display device where the array substrate is disposed can be effectively avoided, and the display effect of the display device is improved.

In summary, the array substrate according to the embodiments of the present disclosure includes a substrate, a plurality of first signal lines and a plurality of second signal lines. The substrate includes a light aperture region and a winding region arranged around the light aperture region, and on the substrate, an orthographic projection of a first winding in each of the first signal lines is overlapped with an orthographic projection of a second winding in the corresponding second signal line. In this way, the distance between two adjacent signal lines in the winding region 100b is larger and the parasitic capacitance generated between them is smaller. When the MUX drive controller is employed to charge the sub-pixels in a time-sharing fashion, the voltage applied to the signal line connected to the sub-pixel that is charged first is less affected by the voltage applied to the signal line connected to the sub-pixel that is charged later. In this way, the voltages applied to the pixel electrodes in the sub-pixels that are charged first will not be greatly reduced, which improves the charging rate of the sub-pixels in the array substrate, and further improves the luminance of the sub-pixels in the array substrate. The phenomenon of dark vertical lines appearing on a display screen of a display device where the array substrate is disposed is effectively avoided, and the display effect of the display device is improved.

In the embodiment of the present disclosure, the sub-pixels connected to each of the first signal lines 200 on the substrate 100 have the same charging period as the sub-pixels connected to the corresponding second signal line 300. In this way, although the orthographic projection of the first winding 202 in the first signal line 200 on the substrate 100 is partially overlapped with the orthographic projection of the second winding 302 in the corresponding second signal line 300, resulting in larger parasitic capacitance therebetween. However, when the sub-pixels connected to the first signal line 100 and the sub-pixels connected to the corresponding second signal line 300 are charged simultaneously, the voltages applied to the first signal line 200 and the corresponding second signal line 300 will not be affected by parasitic capacitance. In this way, the charging rate of the sub-pixels connected to the first signal line 100 and the sub-pixels connected to the second signal line 300 will not be affected by the parasitic capacitance, which further improves the display effect of the display device on which the array substrate is disposed.

In the present disclosure, the plurality of sub-pixels in the array substrate include sub-pixels of at least two colors. In an exemplary embodiment, the sub-pixels of at least two colors include a red sub-pixel, a green sub-pixel and a blue sub-pixel. In the array substrate, the color of the sub-pixels connected to each of the first signal lines 200 is the same as the color of the sub-pixels connected to the corresponding second signal line 300.

For example, the sub-pixels connected to the first signal line 200 and the sub-pixels connected to the corresponding second signal line 300 are all red sub-pixels, green sub-pixels or blue sub-pixels. In this case, sub-pixels in each column of sub-pixels in the array substrate are in the same color.

Figure 8:
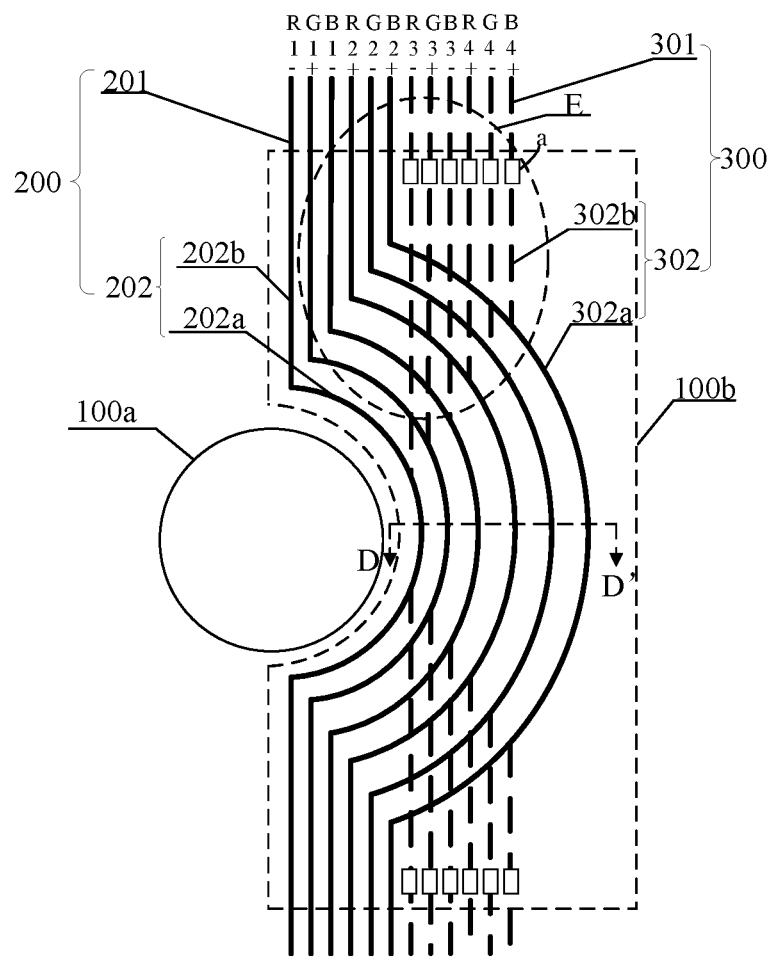
FIG. 8 is a top view of a light aperture region and a winding region in another array substrate according to an embodiment of the present disclosure.
Figure 9:
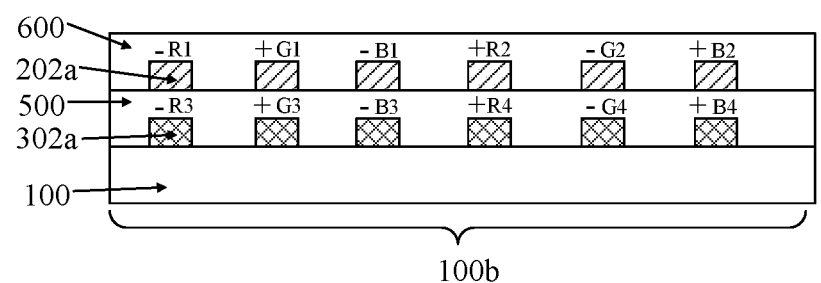
FIG. 9 is a cross-sectional view of the array substrate shown in FIG. 8 at D-D'.

In some embodiments, referring to FIGS. 8 and 9, FIG. 8 is a top view of a light aperture region and a winding region in another array substrate according to an embodiment of the present disclosure, and FIG. 9 is a cross-sectional view of the array substrate shown in FIG. 8 at D-D'. The first winding 202 may include a first jumper wiring 202a arranged around the light aperture region 100b. The second winding 302 may include a second jumper wiring 302a arranged around the light aperture region 100b. In an exemplary embodiment, the first jumper wiring 202a and the second jumper wiring 302a extend around the light aperture region 100a in a direction generally consistent with an extending direction of a part of the boundary surrounding the light aperture region 100a. For example, the boundary shape of the light aperture region 100a is circular, and the extending direction of the first jumper wiring 202a is semicircular or arc-shaped. Thus, the first jumper wiring 202a extends in a semicircular or arc shape. On the substrate 100, a first orthographic projection of the first jumper wiring 202a in the first signal line 200 is at least partially overlapped with a second orthographic projection of the second jumper wiring 302a in the corresponding second signal line 300. That is, the first jumper wiring 202a and the second jumper wiring 302a are directly opposite to each other in a direction perpendicular to the substrate 100.

In the present disclosure, one of the first orthographic projection and the second orthographic projection is within the other. In some embodiments, the width of the first jumper wiring 202a is the same as the width of the second jumper wiring 302a. In this case, a part of the boundary in the first orthographic projection of the first jumper wiring 202a on the base substrate 100 may be overlapped with a part of the boundary in the second orthographic projection of the second jumper wiring 202a. And the extending direction of the part of the boundary in the first orthographic projection is the same as the extending direction of the first jumper wiring 202a, and the extending direction of the part of the boundary in the second orthographic projection is the same as the extending direction of the second jumper wiring 302a.

In an exemplary embodiment, the orthographic projection of the first jumper wiring 202a on the substrate 100 and the orthographic projection of the second jumper wiring 302a on the substrate 100 may have a plurality of positional relationships. In some embodiments, when the area of the first orthographic projection of the first jumper wiring 202a on the substrate 100 is smaller than the area of the second orthographic projection of the second jumper wiring 302a, the first orthographic projection of the first jumper wiring 202a is disposed within the second orthographic projection of the second connection wiring 302a. In some other embodiments, when the area of the first orthographic projection of the first jumper wiring 202a on the substrate 100 is greater than the area of the second orthographic projection of the second jumper wiring 302a, the second orthographic projection of the second jumper wiring 302a is disposed within the first orthographic projection of the first jumper wiring 202a. The embodiment of the present disclosure is schematically illustrated with the second orthographic projection of the second jumper wiring 302a being within the first orthographic projection of the first jumper wiring 202a on the substrate 100.

It should be noted that since the plurality of first windings 202 in the plurality of first signal lines 200 are all arranged around the light aperture region 100b, and the plurality of second windings 302 in the plurality of second signal lines 300 are all arranged around the light aperture region 100b, the length of the plurality of first windings 202 gradually increases along the direction away from the light aperture region 100a in the substrate 100, and a length of the plurality of second windings 302 also gradually increases along the direction away from the light aperture region 100a in the substrate 100. In this case, in the plurality of first signal lines 200 and the plurality of second signal lines 300, the area where the orthographic projections of one first jumper wiring 202a and one second jumper wiring 302a are overlapped on the substrate 100 gradually increases in the direction away from the light aperture region 100a in the substrate 100.

In the embodiment of the present disclosure, as shown in FIG. 8, the first winding 202 may further include a first lead 202b for connecting the first jumper wiring 202a and the first pixel connection wiring 201. The second winding 302 may further include a second lead 302b for connecting the second jumper wiring 302a and the second pixel connection wiring 301. In some exemplary embodiments, an extending direction of the first lead 202b is the same as the extending direction of the first pixel connection wiring 201, and an extending direction of the second lead 302b is the same as that of the second pixel connection wiring 302. In this way, the manufacture of the lead can be facilitated.

The first lead 202b may be regarded as an extension line of the first pixel connection wiring 201 for connecting with the first jumper wiring 202a, and the second lead 302b may be regarded as an extension line of the second jumper wiring 302a for connecting with the second pixel connection wiring 301. The effective connection of the first pixel connection wiring 201 and the first jumper wiring 202a can be realized by providing the first lead 202b, and the effective connection of the second pixel connection wiring 301 and the second jumper wiring 302a can be realized by providing the second lead 302b.

In the embodiment of the present disclosure, the plurality of first signal lines 200 may include a plurality of first signal line groups (not marked in the drawings). Each of the first signal line groups includes at least two consecutively arranged first signal line groups. The first pixel connection wirings 201 in the at least two consecutively arranged first signal lines 200 constitute a first pixel connection wiring group (not marked in the figure). The plurality of second signal lines 300 may include a plurality of second signal line groups (not marked in the figure). Each of the second signal line groups includes at least two consecutively arranged second signal lines 300. The second pixel connection wirings 301 of the at least two consecutively arranged second signal lines 300 constitute a second pixel connection wiring (not marked in the figure).

A plurality of first pixel connection wiring groups and a plurality of second pixel connection wiring groups are alternately distributed. In this way, voltage of the same polarity may be applied to the first winding 202 and the second winding 302 whose orthographic projections on the substrate 100 are at least partially overlapped, and the first signal line 200 and the second signal line 300 corresponding to the first winding 202 and the second winding 302 may charge the sub-pixels connected to the first signal line 200 and the second signal line 300 simultaneously.

In an exemplary embodiment, at least two consecutively arranged first signal lines 200 in one first signal line group one-to-one correspond to at least two consecutively arranged second signal lines 300 in one second signal line group. And the first signal line group and the second signal line group may be adjacent to each other. That is, each of the first signal lines 200 and the corresponding second signal line 300 are respectively disposed in the adjacent first signal line group and second signal line group.

In this case, the number of first signal lines 200 in each of the first signal line groups is the same as the number of second signal lines 300 in each of the second signal line groups. In this way, an identical number of signal lines are arranged between each of the first signal lines 200 and the corresponding second signal line 300. It should be noted that the signal lines arranged between the first signal line 200 and the corresponding second signal line 300 may be at least one of the first signal line 200 and the second signal line 300.

In the embodiment of the present disclosure, voltages of opposite polarities are applied to any two adjacent first signal lines 200 in each of the first signal line groups; and voltages of opposite voltages are applied to any two adjacent second signal lines 300 in each of the second signal line groups. In this way, the voltages stored in any two adjacent columns of sub-pixels in the array substrate have opposite polarities, which can avoid polarization of liquid crystals in a display device after the array substrate is integrated into the display device, causing permanent damage to the display device.

In the embodiment of the present disclosure, when the first pixel connection wiring 201 and the first wiring 202 in the first signal line 200 are arranged in the same layer, and the second pixel winding 301 and the second winding 302 in the second signal line 300 are arranged in the same layer, the first signal line 200 may be arranged in the same layer as the second pixel connection wiring 301. In some embodiments, the array substrate may further include a plurality of gate lines (not marked in the figure) on the substrate 100. The second winding 302 may be arranged in the same layer as the gate lines. In this way, the manufacturing of the array substrate can be simplified.

Figure 10:
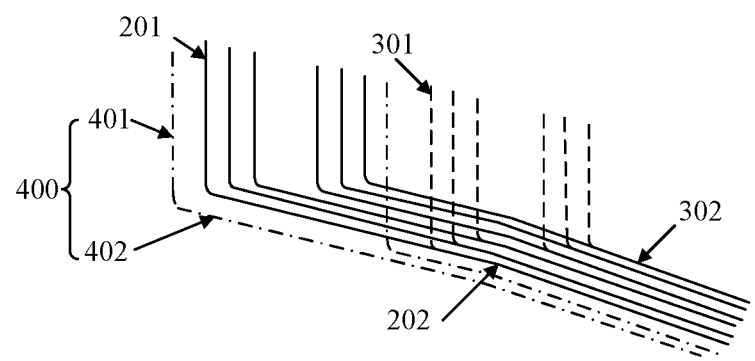
FIG. 10 is a partially enlarged view of the array substrate shown in FIG. 7 at E.

In some embodiments, as shown in FIG. 10, FIG. 10 is a partially enlarged view of the array substrate shown in FIG. 8 at E. The array substrate includes a display region disposed outside the winding region 100b. The plurality of sub-pixels are disposed in the display region. The array substrate may further include a plurality of touch electrode lines 400 (dotted lines in the figure) disposed on the substrate 100. The touch electrode lines 400 include a first touch line 401 disposed in the display region, and a second touch line 402 connected to the first touch line 401 disposed in the winding region 100b. The first touch line 401 and the second touch line 402 are arranged in different layers.

In an exemplary embodiment, the first touch line 401 and the second pixel connection wiring 301 are arranged in the same layer, and the second touch line 402 and the second winding 302 are arranged in the same layer.

In some embodiments, the array substrate may further include a plurality of third signal lines on the substrate 100 which may be disposed in the display region and outside the winding region 100b. The third signal lines may be connected to a column of sub-pixels.

In the present disclosure, as shown in FIG. 9, the array substrate may include a substrate 100, and a first conductive pattern, an insulating layer 500, a second conductive pattern, a planarization layer 600 and a pixel electrode (not shown in the figure) stacked on the substrate 100. The first conductive pattern may include a gate line, a second winding 302, and a second touch line 402. The second conductive pattern may include a first signal line 200, a second pixel connection wiring 301, a first touch line 401 and a third signal line.

In summary, the array substrate according to the embodiments of the present disclosure includes a substrate, a plurality of first signal lines, and a plurality of second signal lines. The substrate includes a light aperture region and a winding region arranged around the light aperture region, and an orthographic projection of a first winding in each of the first signal lines on the substrate is overlapped with an orthographic projection of a second winding in the corresponding second signal line. In this way, the distance between two adjacent signal lines in the winding region 100b is larger, and the parasitic capacitance generated between them is smaller. When the MUX drive controller is employed to charge the sub-pixels in a time-sharing fashion, the voltage applied to the signal line connected to the sub-pixel that is charged first is less affected by the voltage applied to the signal line connected to the sub-pixel that is charged later. In this way, the voltages applied to the pixel electrodes in the sub-pixels that are charged first will not be greatly reduced, improving the charging rate of the sub-pixels in the array substrate, and further increasing the luminance of the sub-pixels in the array substrate. The phenomenon of dark vertical lines appearing on a display screen of a display device where the array substrate is disposed is effectively avoided, and the display effect of the display device is improved.

The embodiment of the present disclosure also provides a manufacturing method of an array substrate, which is applied to manufacturing the array substrate shown in FIG. 5. The method may include the following steps.

In step A1, a substrate including a light aperture region and a winding region is provided, wherein the winding region is arranged around the light aperture region.

In step A2, a plurality of sub-pixels are formed on the substrate and arranged in a plurality of columns.

In step A3, a plurality of first signal lines and a plurality of second signal lines are formed on the substrate, the plurality of first signal lines corresponding to the plurality of second signal lines.

The first signal line includes a first pixel connection line and a first winding connected to the first pixel connection line. The first pixel connection wiring is connected to a column of sub-pixels. The first winding is disposed in the winding region. The second signal line includes a second pixel connection wiring and a second lead connected to the second pixel connection wiring. The second pixel connection wiring is connected to a column of sub-pixels. The second lead is disposed in the wiring region. The first winding and the second winding are arranged in different layers.

On the substrate, an orthographic projection of the first winding in the first signal line is at least partially overlapped with an orthographic projection of the second winding in the corresponding second signal line. Voltages of the same polarity are applied to the first signal line and the corresponding second signal line.

In summary, in the manufacturing method of an array substrate according to the embodiments of the present disclosure, since the distance between two adjacent signal lines in the winding region is larger, the parasitic capacitance generated between them is smaller. When the MUX drive controller is employed to charge the sub-pixels in a time-sharing fashion, the voltage applied to the signal line connected to the sub-pixel that is charged first is less affected by the voltage applied to the signal line connected to the sub-pixel that is charged later. In this way, the voltages applied to the pixel electrodes in the sub-pixels that are charged first will not be greatly reduced, improving the charging rate of the sub-pixels in the array substrate, and further increasing the luminance of the sub-pixels in the array substrate. The phenomenon of dark vertical lines appearing on a display screen of a display device where the array substrate is disposed is effectively avoided, and the display effect of the display device is improved.

The embodiments of the present disclosure also provide a display device. The display device may be any product or component with a display function, such as a mobile phone, a tablet computer, a television, a monitor, a notebook computer, a digital photo frame, a navigator, and the like.

Figure 11:
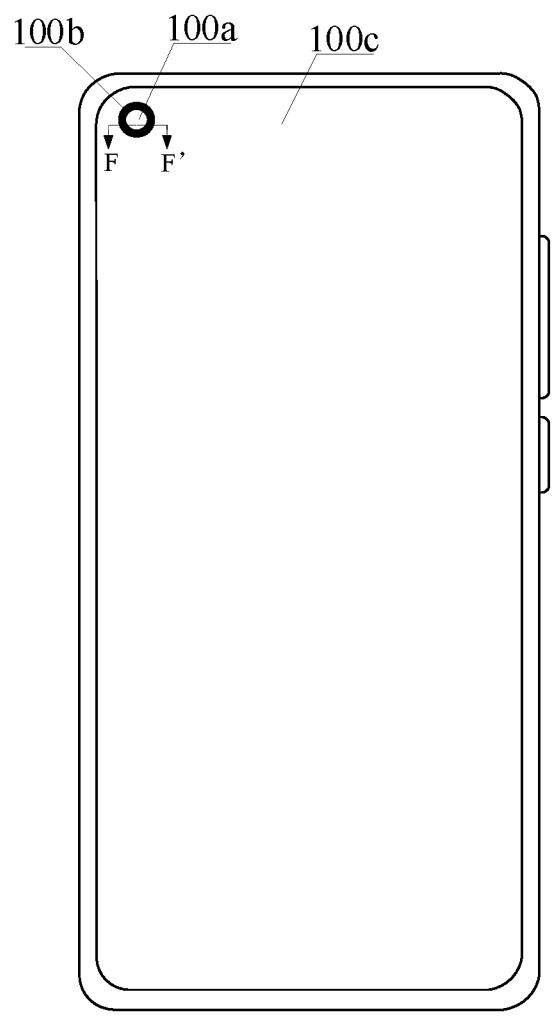
FIG. 11 is a schematic structural diagram of a display device according to an embodiment of the present disclosure.
Figure 12:
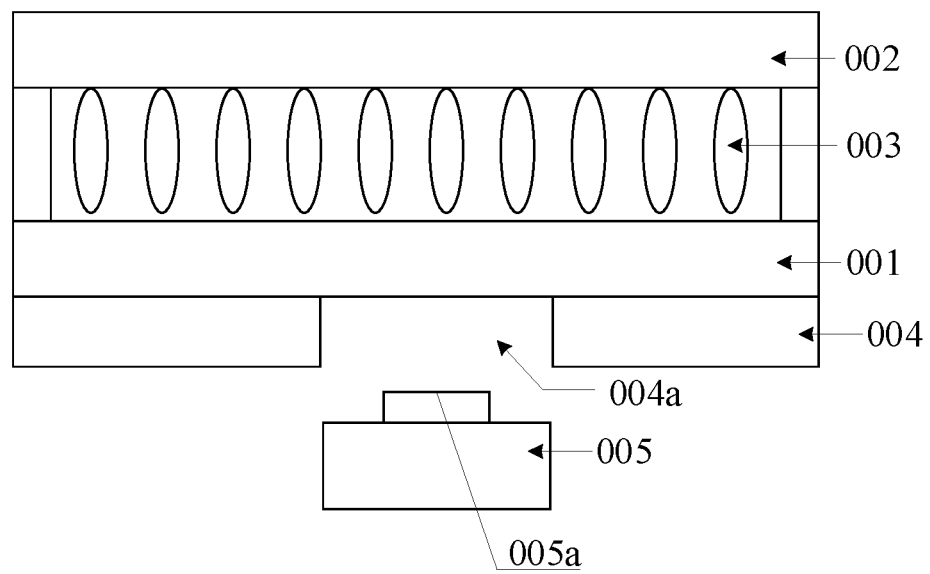
FIG. 12 is a schematic diagram of a film structure of the display device shown in FIG. 11 at F-F'.

As shown in FIG. 11 and FIG. 12, FIG. 11 is a schematic structural diagram of a display device according to an embodiment of the present disclosure, and FIG. 12 is a schematic diagram of a film structure of the display device shown in FIG. 11 at F-F'. The display device may include an array substrate 001 and a color filter substrate 002 arranged oppositely, and a liquid crystal layer 003 disposed between them. The array substrate 001 may be the array substrate shown in FIG. 5 or FIG. 8 in the above embodiments.

The display device may include a light aperture region 100a, a winding region 100b, and a display region 100c. The shape of the light aperture region 100a may be a circle, an ellipse, or two ellipses side by side, or the like, which is not limited in the embodiment of the present disclosure.

In the embodiment of the present disclosure, the display device may further include a driver. The driver is connected to the first signal line and the second signal line in the array substrate. The driver is configured to simultaneously apply voltages of the same polarity to the first signal line and the corresponding second signal line, such that the sub-pixels connected to the first signal line and the sub-pixels connected to the second signal line are charged simultaneously.

In some embodiments, the driver is further configured to simultaneously apply voltages of the same polarity to the first signal line and the second signal line corresponding to the first winding and the second winding with partially overlapped orthographic projections on the substrate, such that the sub-pixels connected to the first signal line and the sub-pixels connected to the second signal line are charged simultaneously.

In the present disclosure, as shown in FIG. 12, the display device may further include a backlight module 004. The backlight module 004 may be disposed on a side of the array substrate 001 away from the color filter substrate 002. The backlight module 004 has a light aperture 004a disposed in the light aperture region 100a. The light aperture 004a is typically a via hole.

In the embodiment of the present disclosure, the display device may further include a photosensitive sensor 005. The photosensitive sensor 005 may be a camera or a light sensor. The photosensitive sensor 005 is disposed on the side of the array substrate 001 away from the color filter substrate 002. An orthographic projection of a photosensitive surface 005a of the photosensitive sensor 005 on the array substrate 001 is within the light aperture region 100a in the array substrate.

In an exemplary embodiment, the photosensitive sensor 005 may be disposed on a side of the backlight module 004 away from the array substrate 001, and the photosensitive surface 005a of the photosensitive sensor 005 may be oriented towards the light aperture 004a in the backlight module 004.

It should be pointed out that the sizes of layers and regions in the drawings may be exaggerated for clarity of illustration. It will also be understood that when an element or layer is referred to as being "on" another element or layer, it may be directly on the other element or there may be an intervening layer. Alternatively, it will be understood that when an element or layer is referred to as being "under" another element or layer, it may be directly under the other element, or there may be more than one intervening layer or element. In addition, it can also be understood that when a layer or element is referred to as being "between" two layers or two elements, it may be the only layer disposed between the two layers or two elements, or more than one intervening layer or component is disposed between the two layers or two elements. Similar reference numerals indicate similar elements throughout.

In the present disclosure, the terms "first" and "second" are only used for descriptive purposes, and cannot be understood as indicating or implying relative importance. The term "a plurality of" refers to two or more, unless otherwise defined.

In the present disclosure, an orthographic projection of a certain device or structure on the substrate in the above embodiments refers to the orthographic projection of the device or structure on the substrate.

As described herein, the term "in the same layer" refers to a relationship between layers simultaneously formed in the same step. For example, when the pixel connection wiring and the jumper wiring in the first signal line are formed by performing one or more steps of the same pattern processing in the same layer of material, they are in the same layer. As another example, the pixel connection wiring and the jumper wiring in the first signal line may be formed in the same layer by simultaneously performing the step of forming the pixel connection wiring in the first signal line and the step of forming the jumper wiring in the first signal line. The term "in the same layer" does not always mean that the thickness or thicknesses of the layer or the layers in the cross-sectional view are the same. The term "in different layers" refers to a relationship between layers that are not formed simultaneously in the same step. For example, when the pixel connection wiring and the jumper wiring in the second signal line are formed by performing one or more steps of different pattern processing in different layers of material, they are in different layers. The term "in different layers" does not always mean that the thickness or thicknesses of the layer or the layers in the cross-sectional view are different.

Described above are merely optional embodiments of the present disclosure, but are not intended to limit the present disclosure. Any modifications, equivalent replacements, improvements, and the like made within the spirit and principles of the present disclosure should be included within the scope of protection of the present disclosure.

What is claimed is:

1. An array substrate, comprising:
a substrate comprising a light aperture region and a winding region, the winding region being arranged around the light aperture region;
a plurality of sub-pixels disposed on the substrate and arranged in a plurality of columns; and
a plurality of first signal lines disposed on the substrate, and a plurality of second signal lines corresponding to the plurality of first signal lines;
wherein
the first signal line comprises a first pixel connection wiring and a first winding that are connected to each other, the first pixel connection wiring being connected to a column of sub-pixels, and the first winding being disposed in the winding region; and
the second signal line comprises a second pixel connection wiring and a second winding that are connected to each other, the second pixel connection wiring being connected to a column of sub-pixels, and the second winding being disposed in the winding region; and the first winding and the second winding being arranged in different layers;
wherein an orthographic projection of the first winding in the first signal line is at least partially overlapped with an orthographic projection of the second winding in the corresponding second signal line on the substrate, and voltages of the same polarity are applied to the first signal line and the corresponding second signal line.

2. The array substrate according to claim 1, wherein the first winding comprises a first jumper wiring arranged around the light aperture region, and the second winding comprises a second jumper wiring arranged around the light aperture region, wherein a first orthographic projection of the first jumper wiring is at least partially overlapped with a second orthographic projection of the second jumper wiring on the substrate.

3. The array substrate according to claim 2, wherein one of the first orthographic projection and the second orthographic projection is within the other.

4. The array substrate according to claim 2, wherein in the plurality of first signal lines and the plurality of second signal lines, an overlapping region of the orthographic projections of one first jumper wiring and one second jumper wiring on the substrate is gradually increased in a direction away from the light aperture region.

5. The array substrate according to claim 2, wherein the first winding further comprises a first lead for connecting the first jumper wiring and the first pixel connection wiring, the first lead being extended in the same direction as the first pixel connection wiring; and the second winding further comprises a second lead for connecting the second jumper wiring and the second pixel connection wiring, the second lead being extended in the same direction as the second pixel connection wiring.

6. The array substrate according to claim 1, wherein charging periods of the sub-pixels connected to the first signal line and the sub-pixels connected to the corresponding second signal line are the same.

7. The array substrate according to claim 6, wherein the plurality of sub-pixels comprise sub-pixels of at least two colors, wherein the color of the sub-pixels connected to the first signal line is the same as that of the sub-pixels connected to the corresponding second signal line.

8. The array substrate according to claim 1, wherein
the plurality of first signal lines comprise a plurality of first signal line groups, each of the first signal line groups comprising at least two consecutively arranged first signal lines, and the first pixel connection wirings in the at least two consecutive first signal lines constituting a first pixel connection wiring group;
the plurality of second signal lines comprises a plurality of second signal line groups, each of the second signal line groups comprising at least two consecutive second signal lines, and the second pixel connection wirings in the at least two consecutive second signal lines constituting a second pixel connection wiring group; and
a plurality of first pixel connection wiring groups and a plurality of second pixel connection wiring groups are alternately distributed.

9. The array substrate according to claim 8, wherein voltages of opposite polarities are applied to any two adjacent first signal lines in the first signal line group; and voltages of opposite polarities are applied to any two adjacent second signal lines in the second signal line group.

10. The array substrate according to claim 8, wherein the first signal line and the corresponding second signal line are respectively disposed in the adjacent first signal line group and second signal line group.

11. The array substrate according to claim 10, wherein a signal line is arranged between each of the first signal lines and the corresponding second signal line, and an identical number of signal lines are arranged between each of the first signal lines and the corresponding second signal line.

12. The array substrate according to claim 1, wherein the first pixel connection wiring and the first winding are arranged in the same layer in the first signal line; and the second pixel connection wiring and the second winding are arranged in different layers in the second signal line.

13. The array substrate according to claim 12, wherein the first signal line and the second pixel connection wiring are arranged in the same layer.

14. The array substrate according to claim 13, further comprising a plurality of gate lines disposed on the substrate, wherein the second winding and the gate lines are arranged in the same layer.

15. The array substrate according to claim 14, further comprising a display region and a plurality of touch electrode disposed on the substrate, wherein the plurality of sub-pixels are disposed in the display region, and the touch electrode lines comprise a first touch line disposed in the display region, and a second touch line disposed in the winding region and connected to the first touch line, the first touch line and the second touch line being arranged in different layers.

16. The array substrate according to claim 15, wherein the first touch line and the second pixel connection wiring are arranged in the same layer, and the second touch line and the second winding are arranged in the same layer.

17. The array substrate according to claim 15, further comprising a plurality of third signal lines disposed on the substrate, the third signal lines being disposed in the display region and outside the winding region and the third signal lines being connected to a column of sub-pixels.

18. A display device, comprising: an array substrate and a color filter substrate arranged oppositely, and a liquid crystal layer disposed between the array substrate and the color filter substrate, wherein the array substrate comprises:
a substrate comprising a light aperture region and a winding region, the winding region being arranged around the light aperture region;
a plurality of sub-pixels disposed on the substrate and arranged in a plurality of columns; and
a plurality of first signal lines disposed on the substrate, and a plurality of second signal lines corresponding to the plurality of first signal lines;
wherein
the first signal line comprises a first pixel connection wiring and a first winding connected to each other, the first pixel connection wiring being connected to a column of sub-pixels, and the first winding being disposed in the winding region; and
the second signal line comprises a second pixel connection wiring and a second winding connected to each other, the second pixel connection wiring being connected to a column of sub-pixels, and the second winding being disposed in the winding region; and the first winding and the second winding being arranged in different layers;
wherein an orthographic projection of the first winding in the first signal line is at least partially overlapped with an orthographic projection of the second winding in the corresponding second signal line on the substrate, and voltages of the same polarity are applied to the first signal line and the corresponding second signal line.

19. The display device according to claim 18, further comprising: a driver connected to the first signal line and the second signal line in the array substrate, wherein the driver is configured to apply voltages of the same polarity to the first signal line and the corresponding second signal line simultaneously, such that the sub-pixels connected to the first signal line and the sub-pixels connected to the second signal line are charged simultaneously.

20. The display device according to claim 18, further comprising a photosensitive sensor, wherein the photosensitive sensor is disposed on a side of the array substrate away from the color filter substrate, and an orthographic projection of a photosensitive surface of the photosensitive sensor on the substrate in the array substrate is within the light aperture region.

\* \* \* \* \*